United States Patent [19]
Heth

[11] 4,238,058
[45] Dec. 9, 1980

[54] BODY CONSTRUCTION FOR ROTARY VALVE

[75] Inventor: Donald J. Heth, Coon Rapids, Minn.

[73] Assignee: M & S Industries, Inc., Coon Rapids, Minn.

[21] Appl. No.: 919,175

[22] Filed: Jun. 26, 1978

[51] Int. Cl.³ ............................................. G01F 11/10
[52] U.S. Cl. ...................................... 222/368; 29/463
[58] Field of Search ............... 222/344, 367, 368, 370, 222/293, 410, 345, 363; 221/265, 277; 74/609; 29/463, 157.1; 302/49; 251/367

[56] References Cited
U.S. PATENT DOCUMENTS

| | | | |
|---|---|---|---|
| 426,559 | 4/1890 | Dithridge | 29/463 |
| 2,428,241 | 9/1947 | Pootjes | 222/368 |
| 2,585,472 | 2/1952 | Kennedy | 302/49 |
| 3,052,383 | 9/1962 | Transeau | 222/368 |
| 3,201,007 | 8/1965 | Transeau | 222/368 |
| 3,647,179 | 3/1972 | Scaramucci et al. | 251/367 |

OTHER PUBLICATIONS
Carter-Day Co. Bulletin N-3126 R, Day Rotary Airlock Feeders and High Pressure Feeder Valves.

Primary Examiner—H. Grant Skaggs
Attorney, Agent, or Firm—Merchant, Gould, Smith, Edell, Welter & Schmidt

[57] ABSTRACT

A pair of housing side sections and a pair of circular housing end sections cooperate to define a cylindrical chamber containing a bladed rotary valve element mounted on a shaft that is journaled in the end sections. The side sections have semicylindrical surfaces that cooperate to provide the cylindrical wall surface of the chamber, and respective inlet and outlet passageways between the chamber and the exterior of the housing. The housing end sections have circular edge surfaces of the same diameter as that of the cylindrical chamber, and circumferential flanges projecting radially outwardly from the circular edge surfaces and received in circumferential recesses in the cylindrical wall of the chamber. The side housing sections have interengaging surfaces projecting radially outwardly from the chamber, and a device extending through the interengaging surfaces for securing all of the housing sections together.

8 Claims, 7 Drawing Figures

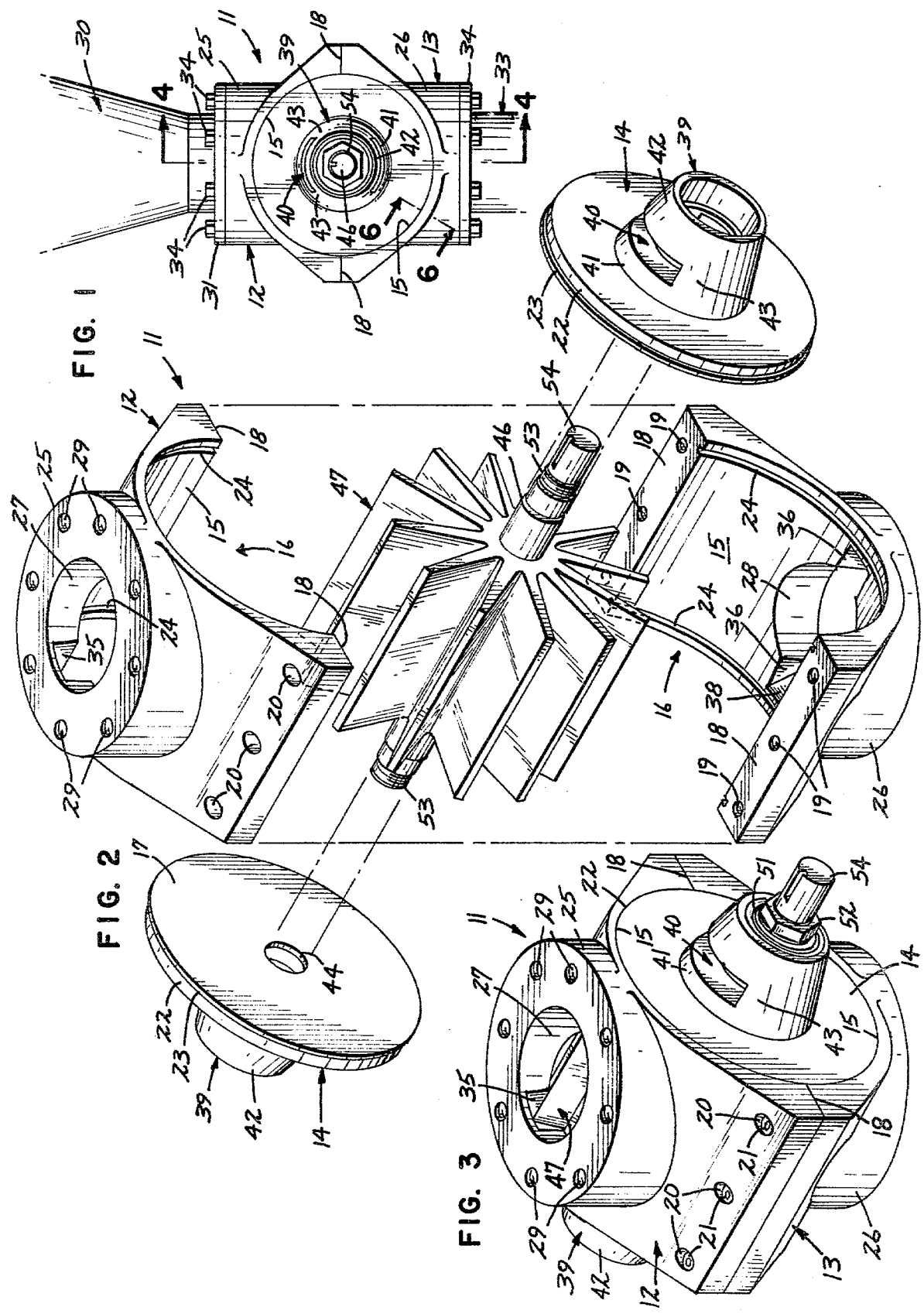

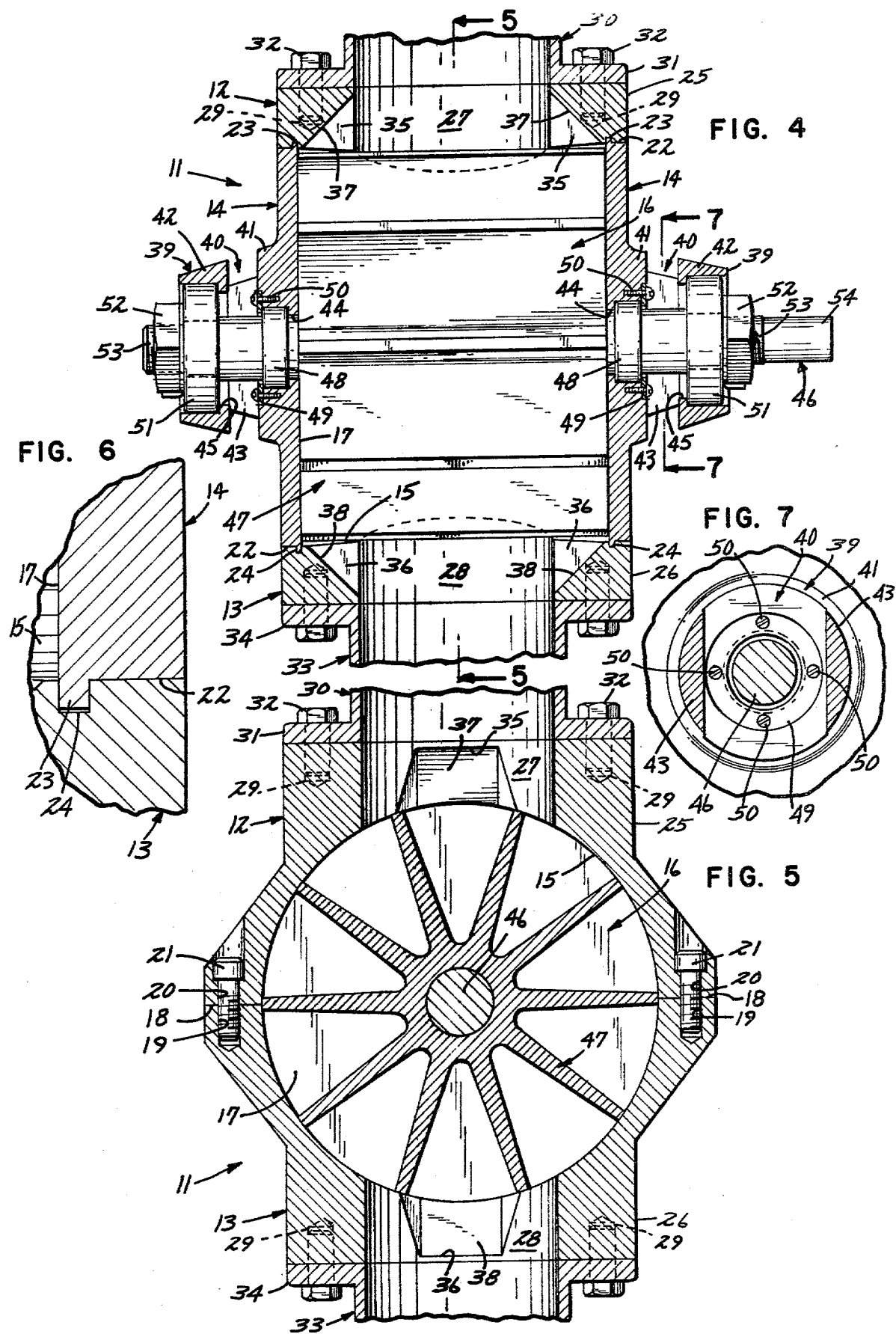

BODY CONSTRUCTION FOR ROTARY VALVE

BACKGROUND OF THE INVENTION

This invention relates generally to rotary valves and air locks, and more particularly to such valves as are used in feeding or controlling the flow of powdered or granular material in material handling systems or equipment.

In many industries wherein powdered or granular material is conveyed in a conduit system, such as in some food processing plants, it is necessary that a high degree of sanitation and cleanliness be maintained. For this reason, where moving mechanical parts are used, it is important that these be sealed to protect material in the system from any exterior source of contamination.

Rotary valves of the type including veined rotors for use as air locks and feeding or flow control valves are well known, and have housings which include main housing sections and opposite end sections each of which are bolted to the main housing sections. Many of these require gaskets for sealing and difficulty has been experienced in economically producing such valves wherein the rotary valving element is maintained in concentric relation to the cylindrical chamber wall of the housing, during use. Other problems include leakage of bearing lubricant for the rotary valve shafts to the interior of the valves.

An important object of this invention is the provision of a rotary valve having a housing which can be economically produced with a minimum of machining of the parts.

Another object of this invention is the provision of a valve in which the axis of the valving rotor will not shift out of alignment with the axis of the valve chamber during use.

Still another object of this invention is the provision of a rotary valve the parts of the housing of which can be secured together in sealing engagement with the use of a minimum number of fasteners.

SUMMARY OF THE INVENTION

The rotary valve of this invention involves a housing defining a valve chamber including a cylindrical surface having a longitudinal axis and flat opposite end wall surfaces, and inlet and outlet passageways through said cylindrical wall surface to said chamber, a rotary valve element in said chamber, a shaft for the valve element, and bearing means journaling said shaft in the housing. The housing comprises a pair of housing side sections defining said inlet and outlet passageways, each of the side sections having a semicylindrical surface portion cooperating with the other thereof to define said cylindrical wall surface, and a pair of circular end sections defining said end wall surfaces and having circular edge surfaces equal in diameter to that of the cylindrical wall surface of the chamber. The end sections each include a circumferential flange projecting radially outwardly from its respective edge surface. Each of said housing side sections define a pair of circumferentially extending recesses aligned with an cooperating with the recesses of the other housing side section to receive the flanges of said end sections. Means is included for securing said housing side sections together, with said flanges disposed in said recesses, to lock said end sections between said side sections.

BRIEF DESCRIPTION OF THE DRAWINGS

FIG. 1 is a fragmentary view in side elevation of the rotary valve of this invention being mounted in a conduit for granular or powdered material;

FIG. 2 is an enlarged exploded view in perspective of the rotary valve of this invention;

FIG. 3 is a perspective view of the assembled rotary valve of this invention;

FIG. 4 is an enlarged fragmentary section taken on the line 4—4 of FIG. 1;

FIG. 5 is a transverse section taken on the line 5—5 of FIG. 4;

FIG. 6 is a greatly enlarged fragmentary section taken on the line 6—6 of FIG. 1; and FIG. 7 is a fragmentary view partly in elevation and partly in section, taken on the line 7—7 of FIG. 4.

DETAILED DESCRIPTION OF THE PREFERRED EMBODIMENT

A valve housing, indicated generally at 11, comprises upper and lower side sections 12 and 13 respectively, and a pair of disc-like opposite end sections 14. The side sections 12 and 13 have opposed semicylindrical inner surfaces 15 which cooperate to define the bore or cylindrical wall surface of a cylindrical chamber 16, the end sections 14 having opposed flat inner surfaces 17 which define the opposite end wall surfaces of the chamber 16. The side sections 12 and 13 are formed to provide flat interengaging faces 18 that extend radially outwardly from diametrically opposite ends of their respective semicylindrical surfaces 15, so as to be disposed in a plane containing the longitudinal axis of the chamber 16 when the side sections 12 and 13 are disposed in chamber defining engagement. In the embodiment illustrated, the lower side section 13 is provided with threaded openings 19 extending downwardly from the surfaces 18 thereof, the upper side section 12 being provided with counterbored openings 20 aligned with the openings 19, for reception of headed screws 21 that are screw threaded into the openings 19, for securing the sections 12 and 13 together.

The end sections 14 have circular edge surfaces 22 of a diameter equal to the diameter of the bore or chamber wall defined by the semicylindrical wall surfaces 15. Adjacent the inner wall surfaces 17, the end sections 14 are provided with radially outwardly projecting circumferential flanges 23 that are received in respective ones of a pair of circumferential channels defined by radially inwardly opening grooves 24 in the semicylindrical wall surfaces 15 of the upper and lower side sections 12 and 13. In the embodiment illustrated, the flanges 23 define radial extensions of the inner wall surfaces 17; and the grooves 24 are inwardly spaced from the adjacent ends of the side sections 12 and 13 so that the outer surfaces of the end sections 14 are substantially flush with the adjacent ends of the side sections 12 and 13, as shown in FIGS. 3, 4 and 6. The above-described interfitting relationship between the housing sections 12, 13 and 14 provides a housing that can be produced with a minimum of machining, and which can be effectively sealed against leakage without the necessity for providing gaskets between the several parts thereof.

The housing sections 12 and 13 are formed to provide respective bosses 25 and 26 having flat outer ends, the boss 25 defining an inlet passageway 27 to the chamber 16, the boss 26 defining an outlet or discharge passageway 28 from the chamber 16 to the exterior of the housing 11. In FIGS. 1, 4 and 5, the outer ends of the bosses 25 and 26 are provided with screw threaded openings 29 by means of which the housing 11 may be connected between portions of a conduit. In the drawings, the discharge end of a hopper is shown fragmentarily and indicated generally at 30, the same having a mounting flange 31 that is secured to the outer end of the boss 25 by mounting screws 32. A discharge conduit section 33 is shown fragmentarily as having a mounting flange 34 that is bolted to the lower end of the boss 26.

With reference particularly to FIGS. 2 and 4, it will be seen that the axial dimension of the cylindrical chamber 16 is somewhat greater than the diameter of the inlet and discharge passageways 27 and 28 respectively. For the purpose of enhancing the flow of granular or powdered material to the chamber 16 and outwardly therefrom, the housing side sections 12 and 13 are formed to provide diametrically opposed channels 35 and 36 respectively, these having respective wall surfaces 37 and 38 that slope from respective chamber end wall surfaces 17 toward the outer ends of their respective passageways 27 and 28.

The end sections 14 are formed to provide central axially outwardly extending bosses 39 each having a transverse opening 40 therethrough and dividing said bosses 39 into axially inner and outer boss portions 41 and 42 respectively connected by laterally spaced legs 43. The central portions of the end sections 50 including the boss portions 41 have counterbored openings 44 therethrough on the longitudinal axis of the chamber 16, the outer boss portions 39 having counterbored axial openings 45 therethrough aligned with the openings 44. A mounting shaft 46 extends axially through the chamber 16 and the aligned openings 44 and 45, and has securely mounted thereon within the chamber 16 a multiveined valve element or rotor 47. Commercially available dust seals 48 are mounted in the counterbored portions of the openings 44, and are held in place by annular retainer plates 49 secured to the boss portions 41 by machine screws or the like 50, see FIGS. 4 and 7. Commercially available bearings 51, preferably of the rolling friction type, are mounted in the counterbored portions of the openings 45, and are held therein by washer equipped lug nuts 52 screw threaded on threaded portions 53 of the shaft 46. The axial spacing between the bearings 51 and their respective dust seals 48 allows any lubricant which may escape axially inwardly of the bearings 51 to escape downwardly through the transverse openings 40 without coming into contact with the dust seals 48. As shown in FIGS. 2–4, the shaft 46 is provided with an end portion 54 that extends axially beyond one of the threaded portions 53 for mounting thereon of a pulley, sprocket wheel or other driven member, not shown, by means of which the shaft 46 and rotor 47 may be driven.

As above-noted, the various housing sections may be easily machined to provide for a close fit between the sections, with relatively simple machining procedures. The interengaging faces 18 of the side sections 12 and 13 may be machined flat and coplanar, after which the sections 12 and 13 are secured together by the screws 21. The cylindrical wall of the chamber 16 is then bored to the specific diameter desired, to form the inner semi-cylindrical surfaces 15 and the grooves 24 are then machined. The end sections 14 are turned to provide the precise diameters of the edge surfaces 22, and bored and counterbored on their centers to provide the openings 44 and 45. The shaft 46 and rotor 47 are mounted on the end sections 14, and the side sections 12 and 13 are separated, and reconnected with the end sections 14 and parts carried thereby placed therebetween. Thus, it will be appreciated that a dust tight housing of clean outer design is achieved, as is a mounting of the rotor 47 which will effectively hold the same against becoming eccentric to the cylindrical wall of the chamber 16 during the effective life of the valve.

While I have shown and described a preferred embodiment of rotary valve, it will be understood that the same is capable of modification without departure from the spirit and scope of the invention, as defined in the claims.

What is claimed is:

1. A rotary valve for guiding particulate material comprising:
   (a) a housing defining a valve chamber through which particulate material is passed, said housing including an inner cylindrical surface having a longitudinal axis and flat opposite inner wall surfaces for contacting the material passing through said chamber, and inlet and outlet passageways through said cylindrical wall surface to said chamber;
   (b) a rotary valve element in said chamber for guiding the particulate material from said inlet passageway to said outlet passageway by the rotation of said valve element;
   (c) a shaft for said valve element;
   (d) bearing means journaling said shaft in said housing;
   (e) said housing comprising a pair of housing side sections defining said inlet and outlet passageways, each of said side sections having a semi-cylindrical surface portion cooperating with the other thereof to define said inner cylindrical wall surface, and a pair of circular end sections defining said inner end wall surfaces and having circular edge surfaces equal in diameter to that of the cyindrical wall surface of said chamber, said inner cylindrical wall surface and said inner end wall surfaces defining interior boundaries of said valve chamber;
   (f) said end sections each including a circumferential flange projecting radially outwardly from its respective edge surface;
   (g) each of said housing side sections defining a pair of circumferentially extending recesses aligned with and cooperating with the recesses of the other housing side sections to receive the flanges of said end sections;
   (h) and means for securing said housing side sections together, with said flanges disposed in said recesses, to lock said end sections between said side sections to form an interior seal of said valve chamber along the juncture of said end wall surfaces and said cylindrical wall surface where said flanges are disposed in said recesses for preventing the escape of the particulate material through said juncture while the particulate material contacts said juncture during the rotation of said valve element without the use of supplemental gasket material.

2. The rotary valve defined in claim 1 in which said flanges each have one side surface coplanar with the chamber end wall surface of their respective end sections to form radial extensions of said end wall surfaces.

3. The rotary valve defined in claim 1 in which each of said side sections has surface areas extending radially outwardly from diametrically opposite ends of its respective semi-circular surface portions, said surface areas of each side section engaging respective ones of corresponding surface areas of the other side section in a plane containing said longitudinal axis of the chamber.

4. The rotary valve defined in claim 1 in which each of said end sections includes a central axially outwardly extending boss having a transverse opening therethrough and dividing said boss into axially inner and outer boss portions and laterally spaced legs connecting the outer boss portion to said inner boss portion, said boss portions having axially aligned openings therethrough for said shaft, portions of said shaft between said boss portions extending through the transverse opening of each boss in spaced relation to said legs, said bearing means comprising a pair of bearing elements each mounted in a different one of said outer boss portions.

5. The rotary valve defined in claim 4 further including a pair of sealing members each mounted in a different one of the inner boss sections and sealingly encompassing a respective portion of said shaft.

6. The rotary valve defined in claim 1 in which said inlet and outlet passageways have inner ends at said chamber, and outer ends, said passageways being cross sectionally generally circular and of a diameter substantially smaller than the distance between said end wall surfaces, said passageways including diametrically opposite channel portions each having a wall surface sloping from respective chamber end wall surfaces toward the outer ends of their respective passageways.

7. A rotary valve for guiding particulate material comprising:
  (a) a housing comprising a pair of circular end sections, an inlet housing section, and an outlet housing section;
  (b) said inlet and outlet housing sections cooperating to define a cylindrical bore therethrough, inlet and outlet passageways respectively from said bore to the exterior of said housing, and a pair of axially spaced radially inwardly opening circumferential grooves in the cylindrical surface of said bore, each circumferential groove extending around the longitudinal axis of the cylindrical bore;
  (c) said inlet and outlet housing sections having interengaging surfaces radially outwardly of said bore and disposed in a plane containing the longitudinal axis of said bore;
  (d) said end sections each having a circular edge surface of a diameter equal to that of said bore, and each including a circumferential flange projecting radially outwardly from its respective edge surface for reception in a different one of said circumferential grooves;
  (e) said end sections having inner wall surfaces cooperating with the cylindrical surface of said bore to define a cylindrical chamber for the passage of particulate material, said inner wall surfaces defining end walls of said cylindrical chamber disposed transverse to the longitudinal axis of the cylindrical bore;
  (f) a valve element supported in said chamber for rotary motion to guide the particulate material from said inlet passageway to said outlet passageway;
  (g) an axial shaft extending axially from opposite ends of said valve element;
  (h) bearing means journaling said shaft in said end sections;
  (i) and means for securing said inlet and outlet housing sections together at said interengaging surfaces to form a seal between the interior of said cylindrical chamber and the exterior thereof at the juncture between each circumferential flange and the recess within which it is received whereby the escape of the particulate material through each of said junctures during the motion of the particulate material past said junctures is prevented without the use of supplemental gasket material.

8. A rotary valve comprising:
  (a) a housing defining a valve chamber through which material is passed, said housing including an inner cylindrical surface having a longitudinal axis and flat opposite inner wall surfaces, and inlet and outlet passageways through said cylindrical wall surface to said chamber;
  (b) a rotary valve element in said chamber;
  (c) a shaft for said valve element;
  (d) bearing means journaling said shaft in said housing;
  (e) said housing comprising a pair of housing side sections defining said inlet and outlet passageways, each of said side sections having a semi-cylindrical surface portion cooperating with the other thereof to define said inner cylindrical wall surface, and a pair of circular end sections defining said inner end wall surfaces and having circular edge surfaces equal in diameter to that of the cylindrical wall surface of said chamber, said inner cylindrical wall surface and said inner end wall surfaces defining interior boundaries of said valve chamber;
  (f) said end sections each including a circumferential flange projecting radially outwardly from its respective edge surface, said flanges each having one side surface coplanar with the chamber end wall surface of their respective end sections to form radial extensions of said end wall surfaces;
  (g) each of said housing side sections defining a pair of circumferentially extending recesses aligned with and cooperating with the recesses of the other housing side sections to receive the flanges of said end sections;
  (h) and means for securing said housing side sections together, with said flanges disposed in said recesses, to form an interior seal of said valve chamber along the juncture of said end wall surfaces and said cylindrical wall surface.

* * * * *